(12) United States Patent
Montero et al.

(10) Patent No.: US 10,429,917 B2
(45) Date of Patent: Oct. 1, 2019

(54) CALCULATING A THROTTLE RATE FOR BATTERY CURRENT LIMITING

(71) Applicant: Dell Products L.P., Round Rock, TX (US)

(72) Inventors: Adolfo S. Montero, Pflugerville, TX (US); Merle J. Wood, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 200 days.

(21) Appl. No.: 15/494,276

(22) Filed: Apr. 21, 2017

(65) Prior Publication Data
US 2018/0309321 A1 Oct. 25, 2018

(51) Int. Cl.
G06F 1/00 (2006.01)
G06F 1/324 (2019.01)
G06F 1/26 (2006.01)
G06F 1/3296 (2019.01)

(52) U.S. Cl.
CPC ............... *G06F 1/324* (2013.01); *G06F 1/26* (2013.01); *G06F 1/3296* (2013.01)

(58) Field of Classification Search
CPC .............................. H02J 13/0062; G05B 15/02
See application file for complete search history.

(56) References Cited

U.S. PATENT DOCUMENTS

| 6,051,957 A * | 4/2000 | Klein | G01R 31/3686 320/107 |
| 2008/0104436 A1* | 5/2008 | Sawyers | G06F 1/3203 713/323 |
| 2013/0294236 A1* | 11/2013 | Beheshti-Zavareh | H04L 47/22 370/235 |

* cited by examiner

*Primary Examiner* — Xuxing Chen
(74) *Attorney, Agent, or Firm* — Norton Rose Fulbright US LLP

(57) ABSTRACT

Operating parameters for an information handling system may be calculated based on known and desired power consumption to quickly limit the power consumption to a desired level. When the operating parameters are calculated the amount of time wasted transitioning from one power level to another power level may be reduced. A controller for the information handling system may determining that a current drawn from a power supply exceeds a threshold level for longer than a threshold duration, calculate a throttle rate for the processor based on the current drawn from the power supply and a target current level, and control the processor to operate based on the throttle rate to reduce the current drawn from the power supply to the target current level.

20 Claims, 3 Drawing Sheets

CALCULATING A THROTTLE RATE FOR BATTERY CURRENT LIMITING

FIELD OF THE DISCLOSURE

The instant disclosure relates to power supplies for computing devices. More specifically, portions of this disclosure relate to throttling computer components to control power consumption.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems operate from power sources, whether AC line voltage sources or a battery. The power consumed by an information handling system varies with the load placed on its computational resources. For example, a processor encoding high definition video consumes more power than a processor formatting a web page for display. Power sources may have limits to how much energy can be provided. That is, a power source usually cannot provide all of its stored energy instantaneously and instead only supplies a limited amount over time. The limit can vary based on the amount of time that the power is consumed at that level. In one example, a power supply may be capable of supplying 6 Amps for long durations of time, but be capable of supplying 8 Amps for short durations of time. When the short duration at the higher supply current is exceeded, the information handling system reduces power consumption to a smaller current level to reduce risk of overheating or fire. Conventionally, the information handing system steps down its operating parameters, such as processor frequency, until a desired lower current draw is obtained. An example of this operation is shown in FIG. 1.

FIG. 1 is a graph illustrating conventional power limiting. Graph 100 illustrates an initial current draw level 112 at 6 Amps. At time 102, the current draw increase to level 114 at 9 Amps. Power consumption may be allowed at this level for time duration 122. At time 104, the power draw begins to ramp down from level 114 to level 116 over time duration 124. At time 106 the current draw is limited to 7 Amps. However, decreasing the current draw can be unpredictable because current consumption is not a value that can be adjusted. Rather, limiting current draw is performed by controlling other parameters of an information handling system. For example, processor frequency can be decreased, and then decreased further, until the current draw reaches level 116. Decreasing from level 114 to level 116 conventionally involves applying a series of changes to operating parameters during time period 124 in a stair-step fashion until the level 116 is reached. This is inefficient because the time period 124 required to reduce power consumption can be a large percentage of a time period 126 that the power consumption is allowed to be above level 116. The longer the information handling system is allowed to operate at the level 114 the more computations the system can perform. The searching process of finding the parameters for the system to obtain level 116 shortens the amount of time that could otherwise be spent at level 114 from a possible time period 126 down to an actual time period 122.

SUMMARY

Operating parameters for an information handling system may be calculated based on known and desired power consumption to quickly limit the power consumption to a desired level. When the operating parameters are calculated the amount of time consumed in transitioning from one power level to another power level may be reduced. Instead of using the time to transition by searching for the appropriate operating parameters, the information handling system may be allowed to operate at higher power levels for longer durations of time. Referring to FIG. 1, by calculating a throttle rate for system components of the information handling system the amount of time transitioning during time period 124 may be reduced or eliminated. Thus, the time period 122 during which the power supply may operate at elevated level 114 can be a longer percentage of the time period 126.

If the power limits on a power supply is a limit on current drawn from a battery, operating parameters for an information handling system may be calculated by determining a ratio of the desired current level to the present current drawn from the power supply. Again referring to FIG. 1, a ratio may be calculated as the ratio of the level 116 to the level 114. Operating parameters for system components of the information handling system may be adjusted based on this ratio. For example, a processor frequency may be scaled by this ratio to decrease current draw from a battery to the desired current level. As another example, a rotation rate of a processor may be scaled by a ratio to decrease current draw from a battery.

A method of controlling power consumption during operation of an information handling system may be performed by a controller, such as an environment controller embedded in the information handling system. The controller may determine that a current drawn from a power supply exceeds a threshold level for longer than a threshold duration. The controller may calculate a throttle rate for a system component, such as a processor, based, at least in part on the current drawn from the power supply and a target current level. The controller may control the processor to operate at the throttle rate by communicating parameters to the processor to reduce the current drawn from the power supply to the target current level. Although a processor is described in this example, the controller may adjust operation of other system components in addition to or instead of the processor to obtain a target current level based on the calculated throttle rate.

In certain embodiments, the throttle rate may be calculated as a ratio of the target current level to the current drawn from the power supply. The throttle rate may be adjusted by estimating a portion of the current drawn from the power supply consumed by the processor to account for a fixed current draw of the other components of the information handling system. The throttle rate may be applied to adjust a power limit value of the processor, a plurality of power limits (e.g., PL1, PL2, PL3, PL4) of the processor, and/or an operating frequency of the processor.

A controller may be configured through a combination of hardware, firmware, and software to perform the throttling of components of the information handling system to reach a target current level. For example, the controller may be a controller executing firmware to process input data from a current sense circuit and output new power limits to a processor based on the input data from the current sense circuit. In some embodiments, the controller may communicate with an x86 processor over a Platform Environment Control Interface (PECI) bus. However, other types of processors and busses can be used to control components of an information handling system.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 2:
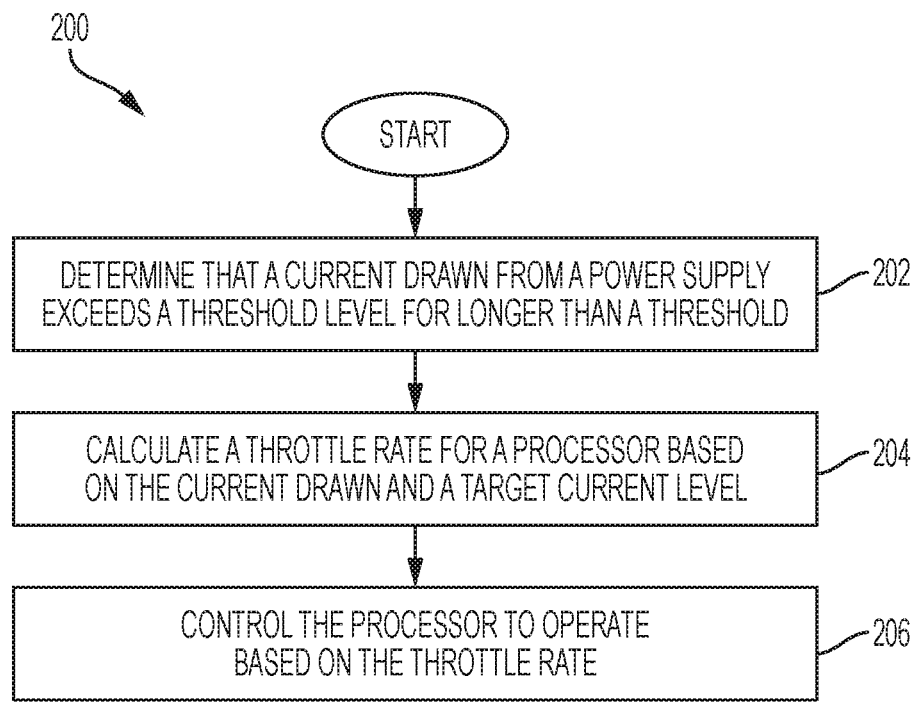
FIG. 2 is a flow chart illustrating an example method for throttling a processor to reduce current draw to a desired current level according to some embodiments of the disclosure.
Figure 3:
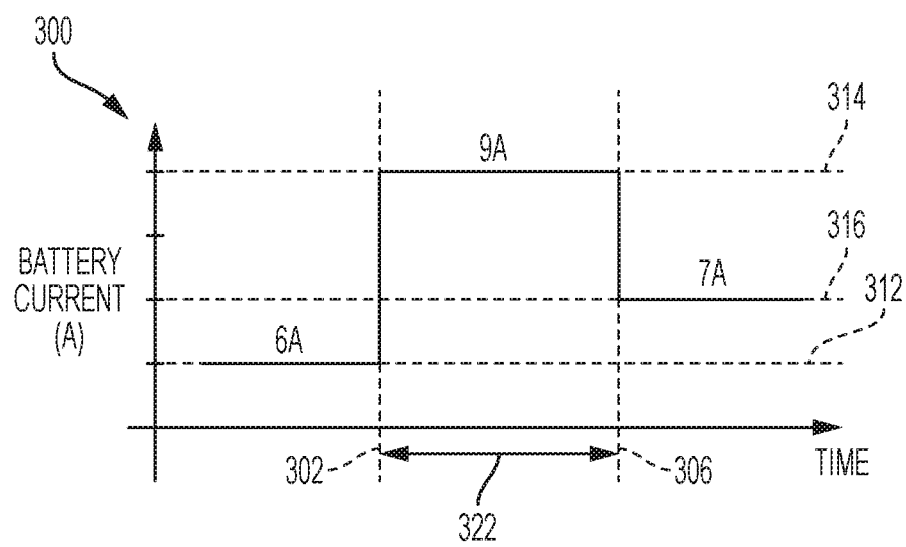
FIG. 3 is a graph illustrating an example method of limiting current draw in an information handling system according to some embodiments of the disclosure.

FIG. 2 is a flow chart illustrating an example method for throttling a processor to reduce current draw to a desired current level according to some embodiments of the disclosure. A method 200 begins at block 202 with determining that a current drawn from a power supply exceeds a threshold level for longer than a threshold time period. In a mobile computing device, the power supply may be a battery and the threshold level may be a discharge "C rate," such as 1 C. The current level may be determined by receiving data from a current sense circuit configured to monitor the current level through an information handling system. The method 200 will be explained with reference to the example operation of FIG. 3. FIG. 3 is a graph illustrating an example method of limiting current draw in an information handling system according to some embodiments of the disclosure. A graph 300 illustrates at time 302 a short-term increase in current draw from level 312 to level 314. After time period 322 at level 314, the current drawn from the power supply is determined to exceed a threshold level for longer than a threshold time period.

Returning to the method 200, at block 204 a throttle rate for a processor may be calculated based on the current drawn and a target current level. In the example of FIG. 3, a target current level is indicated by level 116 and the present current draw is indicated by level 114. A throttle rate may be calculated for the processor as a ratio of the target current level to the current drawn. In the example of FIG. 3, the throttle rate may be calculated as 7/9. An operating parameter, such as a supply voltage or an operating frequency, of the processor may be multiplied by the throttle ratio to reduce power consumption. Throttle rates for other components of an information handling system may be calculated alternatively or in addition to the processor throttle rate. For example, a throttle rate may be calculated for a supply voltage or an operating frequency of a graphics processing unit (GPU) of the information handling system. In some embodiments, the throttle rate for a component may be based on a known or approximate percent of total power load of the information handling system that is consumed by the component. The ratio value may be increased or decreased based on the load percent. For example, when the component load as a percent of system load is small, the ratio may be scaled higher to satisfy the target current limit because the component consumes a relatively small portion of the overall present current drawn from the supply.

Figure 4:
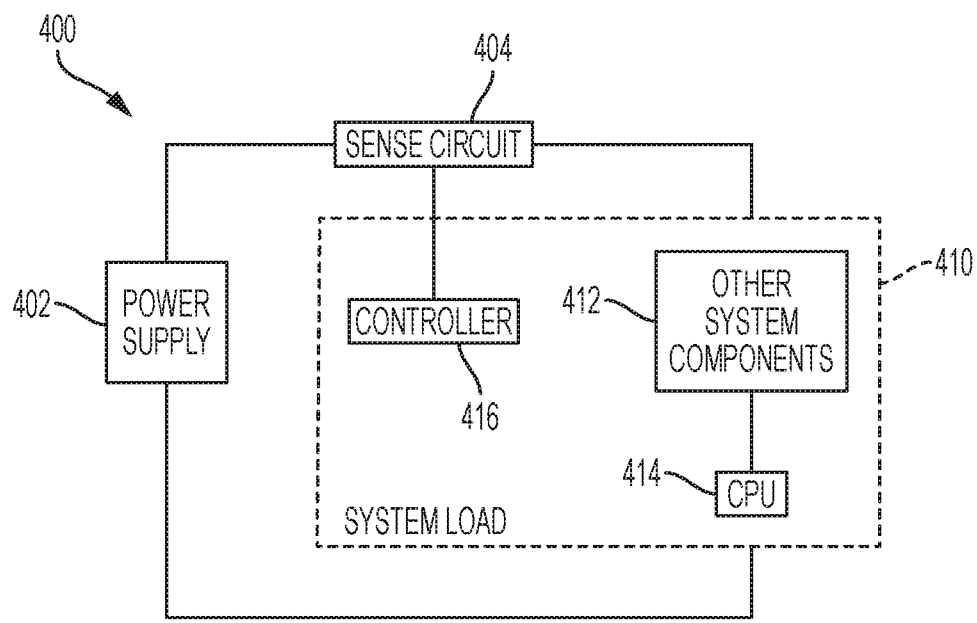
FIG. 4 is a block diagram illustrating control of a processor to limit current draw according to some embodiments of the disclosure.

At block 206, the throttle rate is applied to the processor to reduce power consumption to below the target current limit. A control signal may be communicated over a bus by a controller to implement the throttle rate. One example of such a communication is shown in FIG. 4. FIG. 4 is a block diagram illustrating control of a processor to limit current draw according to some embodiments of the disclosure. A portion of information handling system 400 includes a power supply 402 configured to supply current to system load 410. The system load may include a central processing unit ("CPU") 414 and other system components 412. A controller 416 may be part of the system load and used to control operation of the system components 412 and 414. A sense circuit 404 may be coupled between the power supply 402 and the system load 410. The sense circuit 404 may be, for example, a resistor coupled in series with the power supply 402 and the system load 410 with a voltmeter configured to measure a voltage across the resistor. The controller 416 may receive data, such as a voltage across the resistor, from sense circuit 404 regarding a current draw by the system load 410. This data may be used to determine when a current drawn from the power supply 402 exceeds a threshold level for longer than a threshold time period, such as at block 202 of FIG. 2. The controller may then calculate a throttle rate, such as at block 204 of FIG. 2, and control, at block 206 of FIG. 2, the processor 414 or other system components 412 based on the calculated throttle rate. In some embodiments, the controller 416 may be an embedded controller attached to a motherboard and coupled through the motherboard to the processor 414 and/or other system components 412.

Figure 5:
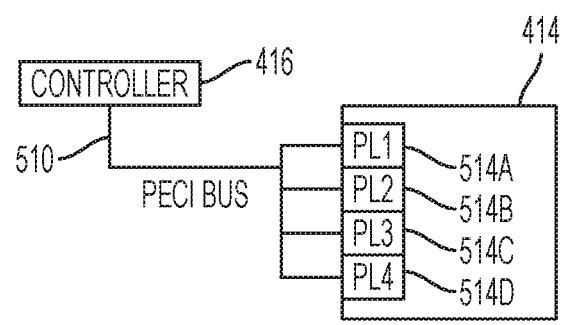
FIG. 5 is a block diagram illustrating control of processor power levels from a controller over a communications bus according to some embodiments of the disclosure.

The controller 416 may apply the throttle rate to operating parameters of the processor 414 by sending values and/or commands to the processor 414. One example bus for providing communications of some operating parameters is a Platform Environment Control Interface (PECI) bus. PECI is an example bus for providing an interface between a processor and a controller that receives processor temperature, performs processor manageability functions, and manages processor interface tuning and diagnostics. The PECI bus may be used to communicate power levels from a controller to the processor. FIG. 5 is a block diagram illustrating control of processor power levels from a controller over a communications bus according to some embodiments of the disclosure. A controller 416 communicates with a processor 414 over PECI bus 510. The values transmitted over the PECI bus 510 may be stored as operating parameters such as power levels PL1 414A, PL2 414B, PL3 414C, and PL4 414D. The power levels PL1-4 414A-D may be different power limits implemented in the processor 414. PL1 may be the long-term CPU power limit that the information handling system can withstand without overheating. This limit may be measured across several minutes of operation. PL2 may be the short-term burst limit used for short-term excursions to higher clocks, such as a turbo boost of the processor to a faster clock frequency to improve responsiveness while loading a program. PL2 may be measured in seconds. The PL3 limit may be monitored in milliseconds and used to prevent instantaneous power use from damaging a battery. The PL4 limit may be a limit that will not be exceeded and used by power limiting algorithms to preemptively limit frequency to prevent current draw spikes above the PL4 limit. Changes to the PL4 limit may have an immediate reaction in the processor. The power limit values 514A-D are examples of values that may be adjusted using a calculated throttling rate. For example, the existing power limit values 514A-D may be read by the controller 416, multiplied by the throttling rate, and then written as new power limit values 514A-D for the processor 414. Other parameters of the processor 414 may be controlled. Furthermore, additionally or alternatively, parameters may be set through another communications bus. For example, values of a BIOS, such as supply voltage, may be adjusted based on the throttling rate through a low pin count (LPC) bus or an enhanced serial peripheral interface (eSPI) bus.

Figure 1:
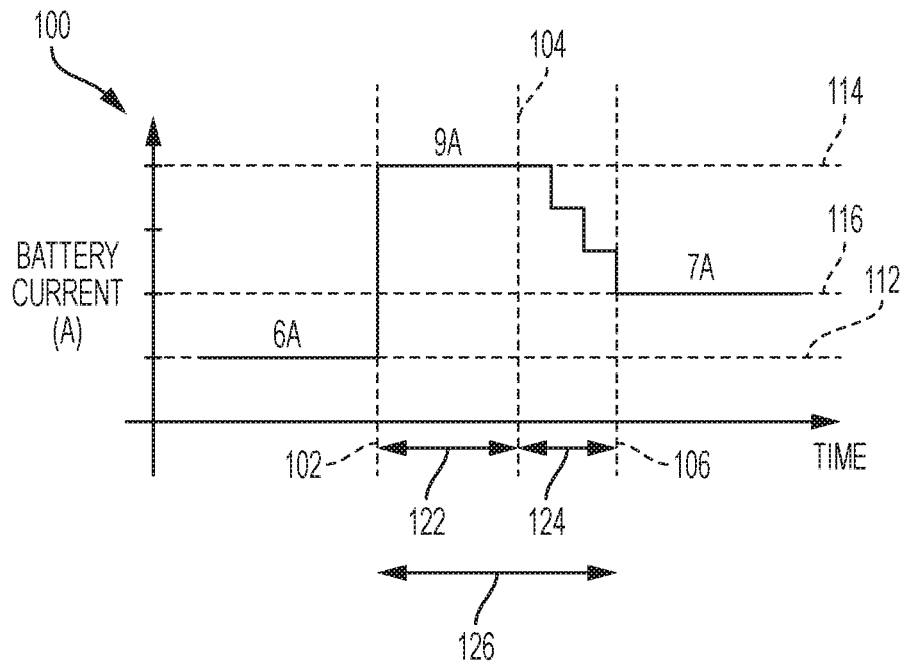
FIG. 1 is a graph illustrating conventional power limiting.

Returning to the example of FIG. 3, the described methods for calculating a throttle rate and controlling the processor based on the calculated throttle rate can improve operation of the information handling system. The graph 300 illustrates an immediate current draw change from the excursion level of level 314 to the limited level of level 316. The controller can make an immediate impact of a known amount on the power consumption. In contrast, the conventional controller operation illustrated in FIG. 1 has an unknown impact on the current as the current is incrementally decreased during time period 124. Because the controller of the disclosed embodiments of the invention can immediately limit the current, the controller can allow the information handling system to remain at the excursion level of level 314 for a longer period of time. The time period 322 at the excursion level of FIG. 3 may be as long as the combination of time periods 122 and 124 of FIG. 1. At this excursion level the information handling system can operate at faster rates and thus process more data. Thus, the information handling system with the described controller can provide improved computational capability.

The schematic flow chart diagram of FIG. 2 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the control and power limiting of different kinds of logic circuitry, such as graphics processing units (GPUs), central processing units (CPUs), digital signal processors (DSPs), embedded controllers, network controllers, peripheral controllers, USB power delivery controllers, audio codecs, and the like. As another example, although the use of throttling rates to decrease power consumption are described similar methods and systems may be used to calculate throttling rates for allowing increased power consumption. When a throttling rate is less than one, power consumption may be decreased; and when the throttling rate is greater than one, power consumption may be increased. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
determining, by a controller, that a current drawn from a power supply exceeds a threshold level for longer than a threshold duration;
calculating, by the controller, a throttle rate for a system component based, at least in part on the current drawn from the power supply and a target current level; and
controlling, by the controller, the system component to operate based on the throttle rate to reduce the current drawn from the power supply to the target current level.

2. The method of claim 1, wherein the step of calculating the throttle rate comprises the step of calculating a ratio of the target current level to the current drawn from the power supply.

3. The method of claim 2, wherein the step of controlling the processor comprises the step of adjusting a power limit of the system component based, at least in part, on the calculated throttle rate.

4. The method of claim 3, wherein the system component being controlled is a processor, and wherein the step of controlling the processor comprises communicating the power limit to a processor over a Platform Environment Control Interface (PECI) bus.

5. The method of claim 2, wherein the system component being controlled is a processor, and wherein the step of controlling the processor comprises adjusting an operating frequency of the processor based, at least in part, on the calculated throttle rate.

6. The method of claim 2, wherein the system component being controlled is a processor, and wherein the step of controlling the processor comprises the step of adjusting a plurality of power limits of the processor based, at least in part, on the calculated throttle ratio.

7. The method of claim 6, wherein the step of adjusting a plurality of power limits of the processors comprises adjusting a PL1, PL2, PL3, and PL4 value.

8. The method of claim 1, wherein the step of calculating a throttle rate for a system component comprises estimating a portion of the current drawn from the power supply consumed by the system component and calculating the throttle rate based on the estimated portion.

9. An apparatus, comprising:
a controller configured to perform steps comprising:
determining that a current drawn from a power supply exceeds a threshold level for longer than a threshold duration;
calculating a throttle rate for a system component based, at least in part on the current drawn from the power supply and a target current level; and
controlling the system component to operate based on the throttle rate to reduce the current drawn from the power supply to the target current level.

10. The apparatus of claim 9, wherein the controller is configured to calculate the throttle rate by calculating a ratio of the target current level to the current drawn from the power supply.

11. The apparatus of claim 10, wherein the controller is configured to control the system component by adjusting a power limit of the processor based, at least in part, on the calculated throttle rate.

12. The apparatus of claim 11, wherein the controller is configured to couple to a Platform Environment Control Interface (PECI) bus and configured to communicate the power limit over the Platform Environment Control Interface (PECI) bus.

13. The apparatus of claim 10, wherein the system component being controlled is a processor, and wherein the controller is configured to control the processor by adjusting an operating frequency of the processor based, at least in part, on the calculated throttle rate.

14. The apparatus of claim 10, wherein the system component being controlled is a processor, and wherein the controller is configured to control the processor by adjusting a plurality of power limits of the processor based, at least in part, on the calculated throttle ratio.

15. The apparatus of claim 14, wherein the controller is configured to control the processor by adjusting a PL1, PL2, PL3, and PL4 value.

16. The apparatus of claim 9, wherein the controller is configured to calculate a throttle rate based, at least in part, on a portion of the current drawn from the power supply consumed by the system component.

17. An information handling system, comprising:
a current sense circuit configured to couple to a power supply and to measure a current drawn from the power supply;
a processor; and
a controller coupled to the current sense circuit and coupled to the processor, wherein the controller is configured to perform steps comprising:
determining, based on data received from the current sense circuit, that a current drawn from a power supply exceeds a threshold level for longer than a threshold duration;
calculating a throttle rate for the processor based, at least in part on the current drawn from the power supply and a target current level; and
controlling the processor to operate based on the throttle rate to reduce the current drawn from the power supply to the target current level.

18. The information handling system of claim 17, wherein the controller is configured to calculate the throttle rate by calculating a ratio of the target current level to the current drawn from the power supply.

19. The information handling system of claim 18, wherein the controller is configured to control the processor by adjusting a power limit of the processor based, at least in part, on the calculated throttle rate.

20. The information handling system of claim 19, wherein the controller is coupled to the processor through a Platform Environment Control Interface (PECI) bus, and wherein the controller is configured to communicate the power limit over the Platform Environment Control Interface (PECI) bus.

* * * * *